Figure 1:
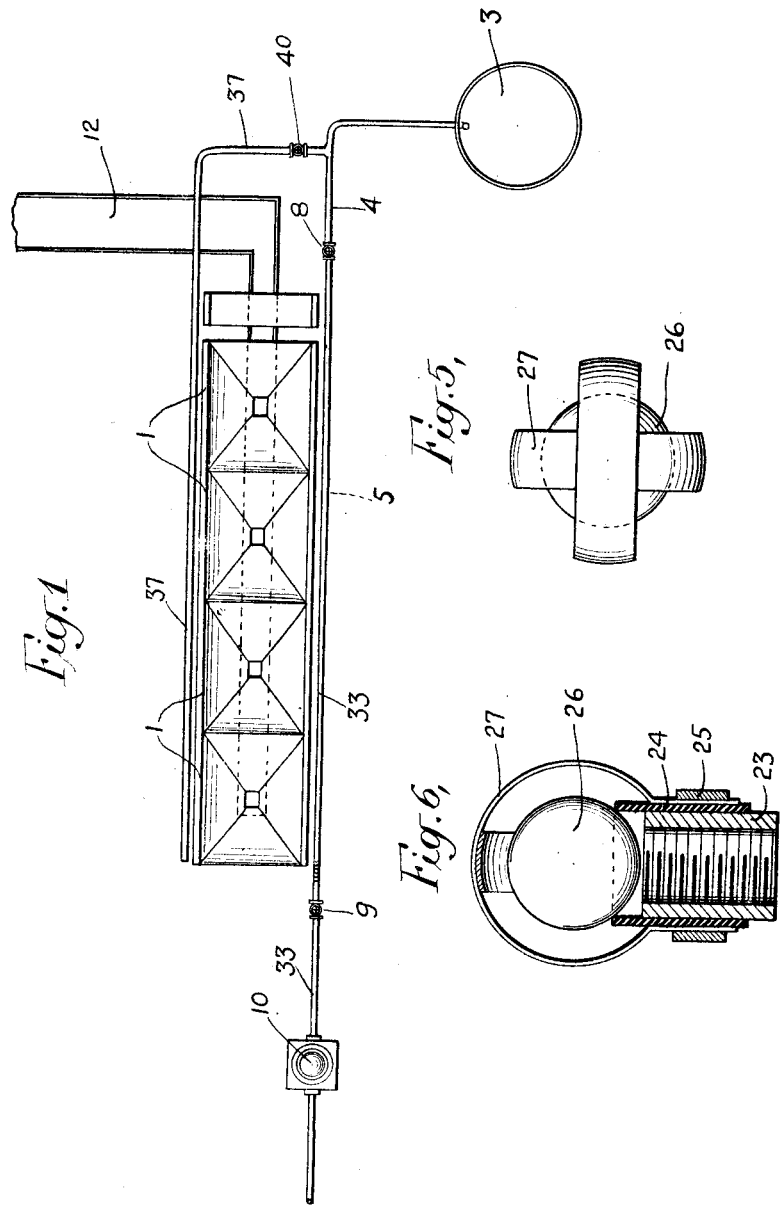

C. BUTTERS.
APPARATUS FOR FILTERING SLIMES.
APPLICATION FILED JUNE 11, 1913.

1,100,219.

Patented June 16, 1914.
3 SHEETS—SHEET 2.

WITNESSES:

INVENTOR,
Charles Butters,
BY
Kenyon & Kenyon,
his ATTORNEYS.

C. BUTTERS.
APPARATUS FOR FILTERING SLIMES.
APPLICATION FILED JUNE 11, 1913.

1,100,219.

Patented June 16, 1914.
3 SHEETS—SHEET 3.

WITNESSES:
Newton Burgess
John O. Seempler

INVENTOR,
Charles Butters,
BY
Kenyon & Kenyon
his ATTORNEYS.

UNITED STATES PATENT OFFICE.

CHARLES BUTTERS, OF OAKLAND, CALIFORNIA.

APPARATUS FOR FILTERING SLIMES.

1,100,219.  Specification of Letters Patent.  Patented June 16, 1914.

Application filed June 11, 1913.  Serial No. 772,946.

*To all whom it may concern:*

Be it known that I, CHARLES BUTTERS, a citizen of the United States, and a resident of Oakland, county of Alameda, State of California, have invented certain new and useful Improvements in Apparatus for Filtering Slimes, of which the following is a specification.

The object of my invention is to shorten the time taken for a cycle of operation in the process of filtering valuable compounds, such as slimes, which result from the well known cyanid process of treating ores.

Another object of my invention is to lower the cost of filter leaves while at the same time increasing their life and value.

In abstracting the values from slimes one of the most difficult and troublesome problems is to dislodge reliably and within an economical time, the slime cake from the surface of the filter medium after the filter process has been completed, without injuring the filter surface of the leaf.

It has been the practice heretofore to dislodge slime cakes by air pressure placed on the interior of the leaves while suspended in the air, or this has been accomplished in some cases by water under pressure being passed through the filter medium in a direction reverse to that of the filtrate. It has been supposed heretofore that to dislodge the cake reliably and within an economical time, pressure was necessary whether of air, water or other fluid in the dislodging step, and special precaution has sometimes been taken to get a uniformly thick, cohesive and resistant cake deposit such that the fluid under pressure might dislodge it as an entirety and make it unnecessary to use additional means to dislodge the cake completely. By my process such uniformity of the cake is of no importance at all to the cake dislodgment, and consequently the filtering operation may be more economical.

If notable internal pressure is put on a leaf for cake-dislodgment purposes, a heavy filter medium is necessary and means must be provided to prevent distention or ballooning of the filter medium. Various means have been devised to this end, all of which have added to the difficulty of cake-dislodgment. As a matter of practice, too, it is found that all such means are a hindrance to proper and economical operation; further, they shorten the life of the leaves, but they have been regarded as indispensable when former practicable methods of cake-dislodgment have been used.

The efficiency of the leaves heretofore used is low, first, because a considerable amount of the surface of the filter medium is obstructed by the means used to prevent ballooning, such as strips down the sides; and second, because of stitching the media together or by bolting strips onto the outside of the leaf to prevent ballooning, comparatively large holes are made in the media. Also, these holes make the media more liable to rupture under internal pressure, thus shortening their life.

I have discovered that pressure is unnecessary to reliable cake-dislodgment within an economical time, and that complete success can be attained by saturation of the entire area of the filter medium. It is found in practice that these cakes have unusual adhesion and cohesion, and that when a cake is formed on each side of a filter leaf they are not easily dislodged. Due to the great cohesion of the cake it is very important that the upper part, as well as the other parts, of the filter medium be saturated in the dislodging step, as it is found that the adhesion of the cake to the medium is greatly lessened, and that the time for dislodgment is materially shortened thereby. This has not been attained in leaves heretofore constructed because they contained enough air to prevent water reaching the top part thereof even when admitted under pressure. This was true in spite of the fact that the leaf might be under vacuous conditions at the time the water was first admitted.

The cake to be dislodged from a filter medium adheres more closely to the surface of the filter medium if there is any excess of external over internal pressure. It is, therefore, desirable to have the internal and external pressures equalized during the dislodging step, and I have devised means to that end, which equalize such pressures by allowing communication between the external and the internal water. A leaf which embodies my invention cannot have internal pressure during the dislodging step. But such pressure is not necessary, however, since by my invention the cake can be dislodged without it. It is understood that the cake is dislodged while the leaf is submerged in wash water. This means that there will be considerable hydrostatic pressure on the outside of the leaf. It has been found by experiment that the difference in specific gravity of the more or less dirty tank wash water and the relatively clean cake-dislodging water would be sufficient to maintain a column of the relatively clean water inside the leaf several inches higher than the level of the tank wash water so that the relief valve and the inlet for the cake-dislodging water may be several inches above the surface of the tank wash water without producing greater pressure inside the leaf than the outside pressure on the leaf. The above fact is useful in practice as it gives considerable latitude between the level of the tank wash water and that of the entrance to the relief valve and that of the funnel valve through which the dislodging water is supplied to the leaf, thus preventing the entrance of the tank wash water into the leaf, while at the same time preventing excess of internal pressure.

The above facts make it possible in my type of leaf to completely saturate the entire filter surfaces during the dislodging step because the air is permitted to escape through the relief valve. Also, as there is never any internal pressure a lighter filter cloth may be employed and all means heretofore required to prevent ballooning dispensed with. Therefore, the filter surfaces may be smooth, being clear of all manner of bracing, stitching or other surface-roughening means which have heretofore been necessary to prevent ballooning when other practicable methods of cake-dislodgment have been used, and consequently the cake is more easily dislodged.

Other advantages will be apparent from the following detailed description taken in connection with the accompanying drawings, in which—

Figure 2:
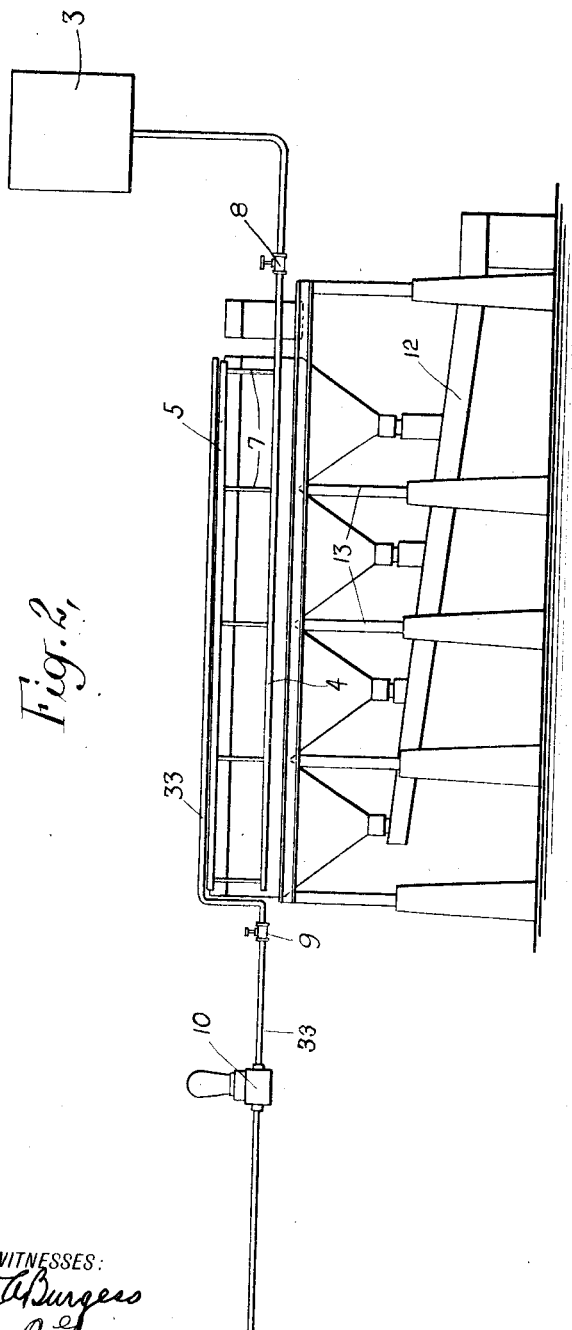
Figure 3:
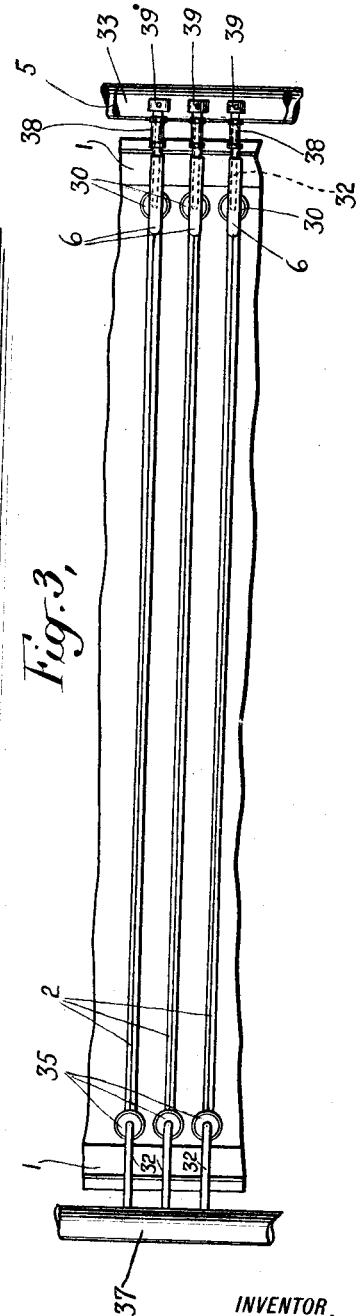
Figure 4:
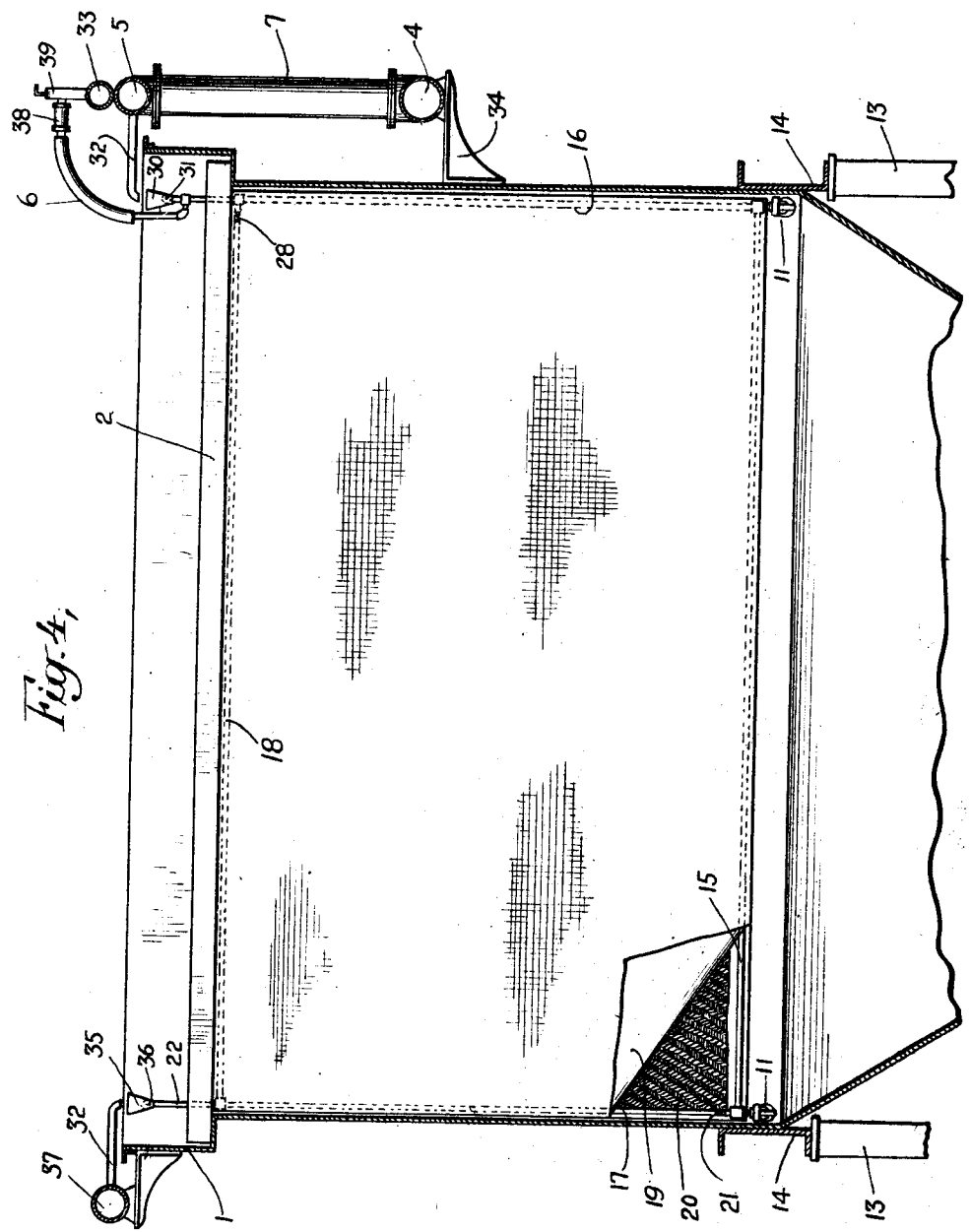

Figure 1 shows a diagrammatic plan view of a general layout showing a clean water source and piping for supplying the water to the leaves; Fig. 2 is a side elevation of the devices shown in Fig. 1; Fig. 3 is a plan of a portion of a vat with several leaves therein; Fig. 4 is a view of a leaf embodying my invention; Fig. 5 is a plan view of a relief valve; and Fig. 6 is a section of a relief valve.

In Fig. 1 are shown a plurality of vats 1 in which the leaves 2 are placed as shown in Fig. 3. These leaves are connected with the clean water source 3 by means of piping 4, risers 7, pipe 5, pipes 32, and funnel 30 on one side, and by means of the pipe 37, pipes 32 and funnels 35 on the other side. In each case the pipes 32 may discharge into funnels, or other suitable means for conducting water into the leaves. In order that the water may reach all the leaves quickly the pipe 5 is arranged along the top of the vats and is connected with the pipe 4 from the water supply 3 by means of risers 7. The interior of the leaves is connected with the vacuum-pump 10 through end members 16, members 6, sight-glasses 38, valve members 39 and pipe 33. The pipes 4, 5 and 33 are suitably supported by any means, such as members 34 fastened to the side of the vat. The pipe 37 may be supported by similar means. In pipe 4 is placed valve 8 so that the water may be admitted to, or cut off from, the leaves. In the pipe 37 is the valve 40 by which the admission of water into the pipe 37, and therethrough into the leaves through funnels 35, may be controlled as hereinafter explained. The pump 10 is shown connected with the pipe 33 for the purpose of creating a vacuum within the leaves when desired. When it is desired to begin the filtering operation the valves 8 and 40 are closed, the valve 9 is opened and the pump 10 started to decrease the pressure within the filter leaves, and thereby draw a filtrate through and form cakes on the surface of the filter media 19. When cakes of sufficient thickness have been formed, they may be treated in well known ways with barren solution and then with wash water, and they are then ready to be dislodged. The valve 9 may then be closed and the valve 8 opened, thereby permitting water to run into the leaves from the tank 3 through the piping 4, risers 7, pipe 5, pipes 32 and funnels 30, thus dispelling the air through the valves 35, filling the leaves, saturating the filter media and thereby causing the cakes to drop within four or five minutes. The valve members 31 will have been removed from the funnels to allow the entrance of water into the leaves, or they may be made of light material such as wood, in which case they will automatically open to allow water to enter and will be in position again when vacuum is applied. The thick slime is then run out from the bottom of the vats into the runway 12, and thence to the slime-pit. The vats may be properly supported by any convenient means such as the pillars 13 and I-beams 14, as shown in Fig. 4.

The valves 35 may be of the type shown in Figs. 5 and 6, or they may be funnel-valves, as shown in other figures of the drawing, preferably the latter, for reasons given hereinafter.

As shown in Fig. 4, the leaf comprises a frame having members 15, 16, 17 and 18, preferably of tubing. Over this frame is secured a filter medium 19 of canvas or other suitable material. Inside the filter-leaf is a fibrous filler 20 preferably of cocoa mat, for holding the sides thereof apart when vacuum is created within the leaf. This filler may be supported by any suitable means, as for instance, from the top frame member 18. The lower frame member 15 is perforated or slotted along its upper side and is connected to a vacuum pump 10, or other pressure-decreasing means through the right-hand end member 16 and the connection 6, which may be of rubber, or other suitable material, sight-glass 38, valve member 39 and the pipe 33. The filtrate is removed by means of the pump 10. The left-hand frame member 17 is plugged by any suitable means such as a wooden plug, as shown at 21 in Fig. 4. The top frame member 18 is perforated or slotted along its lower side and to this member is attached a suitable relief valve 35. This member is also plugged as shown at 28, and is rigidly connected to the right-hand end member to make a rigid frame structure. It is useful to be able to wash out the cocoa mat occasionally between filtering operations by admitting water from the tank 3 through valve 40, pipe 37, pipes 32 into the funnels 35, and for this purpose the relief valve may be provided with a funnel. At the time that the water is admitted the valve member, such as a ball 36, is removed from the funnel. It is not necessary that the relief valve be connected to the frame member, but this arrangement is preferred and it is so illustrated in the drawings. The pipe 22 connecting the valve to the leaf may be of any suitable length. The relief valve should be connected to the upper portion of the leaf in order to allow the escape of air. Valves 11 are attached to the lower frame member of the leaf. These valves, as will be seen are inverted. They are shown in detail in Figs. 5 and 6. Their function is to open when the internal pressure has substantially equaled the external pressure, and thereby open free communication between the exterior and interior of the leaf, whereby the hydrostatic pressures on the sides of the filter surfaces will be equalized. These valves may be connected to any submerged portion of the leaf, but they are preferably connected as shown in the drawing. As shown in Fig. 4 the leaf is provided with a funnel valve at each upper corner. While these valves may be similar in structure they have different functions. The function of the valve at the right-hand corner is to admit water without pressure into the leaf for the purpose of dislodging the cake as heretofore described. The functions of the funnel valve at the left-hand corner are to allow water to be run through the leaf for occasionally washing out the cocoa mat, or other filler, after the cake has been dislodged, and to permit air to escape while the leaf is being filled with water from the funnel at the opposite corner during the cake-dislodging step. The funnel valves at the right-hand corners of the leaves may be dispensed with and water for dislodging the cakes supplied through the members 6, if desired. There can be no internal pressure under these circumstances due to the presence of the valves 11 at the bottom of the leaves and the relief valves at the top thereof. Water may be run through the funnels 35, and consequently through the leaves and out at the valves 11 while the vat is being filled with slime to submerge the leaves for the purpose of avoiding the entrance of slimes into the leaves at that time. At this time the balls 36 will be removed from the funnels to permit the water to run through the leaf.

The preferred form of pressure-equalizing valve is shown in detail in Figs. 5 and 6, but other kinds of valve may be used at the lower corners of the leaves provided it will allow communication between the external and internal water when the internal pressure nearly equals the external pressure. The valve hereafter described is by way of example only and must not be considered as limiting my invention. As shown in Figs. 5 and 6 the valve consists of a pipe-coupling 23 around which is securely clamped a rubber tube 24 the upper end of which acts as a valve seat. This tube is clamped around the coupling 23 by a band 25 in any well known manner. Arranged to coöperate with the seat 24 is a ball 26 of rubber. For the purpose of confining the movement of the ball, guards 27 are placed around same, as clearly shown in the drawing. The function of this valve when connected to a submerged portion of the leaf is to establish communication between the water inside the leaf and the water outside the leaf at the time that the internal hydrostatic pressure nearly equals the external hydrostatic pressure, so that these pressures will be equalized and kept equalized so long as the valve remains open. This valve automatically closes if the external pressure becomes greater than the internal pressure, and this prevents entrance thereafter of external water into the leaf.

The operation of my device is as follows: The leaf is completely submerged in the slimes bath, care being taken not to allow slimes to enter the funnel valves. To prevent slimes entering the leaf through the valves 11 before the vacuum is turned on, water may be run through the leaf at that time by admitting it through the funnels 35 and allowing it to discharge through the valves 11. After the leaves are submerged a few inches the water supply through the funnels 35 is cut off, the balls placed therein, and suction applied to the interior of the leaf by any means such as a vacuum pump 10. As soon as the vacuum is turned on, the valves 11, as well as the valves 30 and 35, will close and seal. The filtrate is carried off by the pressure-decreasing means and the suction is continued until a cake of proper thickness is deposited on the filter surface. This cake may then be variously treated with barren solution and wash water, the valves 11, 30 and 35 remaining sealed throughout these operations. In order to dislodge the cakes, the filter leaves being submerged, in wash water, the vacuum is turned off, the balls 31 are removed from funnels 30 and water is admitted through pipes 32 and funnels 30 into the bottom frame member 15. As the water rises in the leaf, the air passes out through the relief valve 35 at the left-hand corner so that the water may rise to the top of the leaf and completely fill it and so saturate the entire surface of the filter media. At some point during this filling operation the valves 11 at the lower corners will open and permit communication between the external and internal water thereby equalizing the external and internal pressures, and the cakes will then be rapidly dislodged. The filter leaf may then be washed out internally by admitting water through the funnel valves 35 at the left-hand corner and allowing it to discharge through the valves 11 at the lower corners.

Various changes may be made in my apparatus and still fall within the scope of the invention.

Having described my invention, what I claim as new and desire to secure by Letters Patent, is:—

1. A filter leaf having means for equalizing the external and internal water pressure thereon while said leaf is submerged.

2. A filter leaf having submerged pressure equalizing means connected therewith.

3. A filter leaf having automatic hydrostatic pressure equalizing means connected thereto.

4. A filter leaf having a submerged pressure equalizing valve connected thereto.

5. A filter leaf having a submerged automatic pressure equalizing valve connected thereto.

6. A filter leaf having a hydrostatic pressure equalizing valve connected with a submerged portion thereof.

7. A filter leaf having an automatic hydrostatic pressure equalizing valve connected with a submerged portion thereof.

8. In a filter leaf the combination of a frame structure, filter media carried thereby, an open water pipe connected to the upper portion of said leaf and a submerged pressure equalizing valve connected with said leaf.

9. In a filter leaf the combination of means for admitting water without pressure to the interior thereof and means for allowing communication between external and internal water of the leaf when the leaf is submerged.

10. In a filter leaf the combination of means for admitting water without pressure to the interior of the leaf, means for allowing communication between the exterior and interior water of the leaf when the leaf is submerged and means for allowing the escape of air from the leaf.

11. In a filter leaf the combination of a funnel for admitting water to the leaf, means for supplying water to the funnel, a valve for allowing communication of the exterior water and interior water of the leaf when it is submerged and a relief valve for allowing the escape of air from said leaf.

12. A filter leaf comprising a frame, a filter medium mounted on each side of said frame, means for separating the sides of the filter medium, and means adapted to equalize the water pressure between the inside and outside of said leaf.

13. In a suction filter leaf, the combination of a frame, filter media carried by said frame, and a valve connected with an immersed portion of said leaf for equalizing the internal and external water pressure thereof.

14. In a suction filter leaf, the combination of a frame, filter media carried by said frame, and a valve connected with an immersed portion of said leaf to prevent an excess of internal water pressure therein.

15. In a suction filter leaf, the combination of a frame, filter media carried by said frame, an air valve connected with the upper portion of said leaf, and a valve for equalizing the internal and external hydrostatic pressure of said leaf connected to the lower portion thereof.

16. In a filter leaf the combination of means for admitting water to the leaf without pressure, means for equalizing hydrostatic pressures on the leaf, and means for running water through the leaf to wash the interior thereof.

17. In a filter leaf, the combination of a header, a frame, a filter medium surrounding said frame and having a plurality of openings in its bottom side adapted to be closed by suction, and a porous filler between the sides of said medium.

In testimony whereof, I have signed my name to this specification, in the presence of two subscribing witnesses.

CHARLES BUTTERS.

Witnesses:
 NEWTON A. BURGESS,
 EDWIN SEGER.